(12) United States Patent
Harris

(10) Patent No.: US 7,990,411 B2
(45) Date of Patent: Aug. 2, 2011

(54) VIDEOCONFERENCING SYSTEMS WITH RECOGNITION ABILITY

(75) Inventor: Scott C. Harris, Rancho Santa Fe, CA (US)

(73) Assignee: Southwest Technology Innovations LLC, Rancho Santa Fe, CA (US)

( * ) Notice: Subject to any disclaimer, the term of this patent is extended or adjusted under 35 U.S.C. 154(b) by 303 days.

(21) Appl. No.: 12/190,304

(22) Filed: Aug. 12, 2008

(65) Prior Publication Data

US 2008/0307325 A1    Dec. 11, 2008

Related U.S. Application Data

(63) Continuation of application No. 10/754,121, filed on Jan. 9, 2004, now Pat. No. 7,425,980, which is a continuation of application No. 10/064,158, filed on Jun. 14, 2002, now Pat. No. 6,693,663.

(51) Int. Cl.
*H04N 7/14* (2006.01)
(52) U.S. Cl. ........... 348/14.08; 348/14.11; 348/14.12
(58) Field of Classification Search .... 348/14.01–14.16; 709/204; 370/260–261
See application file for complete search history.

(56) References Cited

U.S. PATENT DOCUMENTS

| 5,272,526 | A |  | 12/1993 | Yoneta |
| 5,627,936 | A | * | 5/1997 | Prasad et al. ............ 386/253 |
| 5,844,600 | A |  | 12/1998 | Kerr ....................... 348/14.08 |
| 5,953,049 | A |  | 9/1999 | Horn |
| 6,181,778 | B1 |  | 1/2001 | Ohki et al. ................ 379/52 |
| 6,332,153 | B1 |  | 12/2001 | Cohen |
| 6,356,295 | B1 |  | 3/2002 | Mani ....................... 348/14.08 |
| 6,433,813 | B1 | * | 8/2002 | Forkner et al. ............ 348/14.07 |
| 6,456,709 | B1 |  | 9/2002 | Cox |
| 6,771,302 | B1 |  | 8/2004 | Nimri |
| 6,804,334 | B1 |  | 10/2004 | Beasley |
| 2001/0018771 | A1 |  | 8/2001 | Walker et al. |
| 2003/0098869 | A1 |  | 5/2003 | Arnold et al. |

FOREIGN PATENT DOCUMENTS

| JP | 05-183654 |  | 7/1993 |
| JP | 04-260193 |  | 10/1993 |
| JP | 05260193 | A * | 10/1993 |
| JP | 08298653 | A * | 11/1996 |

* cited by examiner

*Primary Examiner* — Melur Ramakrishnaiah
(74) *Attorney, Agent, or Firm* — Law Office of Scott C Harris

(57) ABSTRACT

A videoconferencing system which encodes different streams of information. The information may include video, audio, speech recognized versions of the audio, and language translated versions of the audio. Text may be sent as part of the videoconference.

12 Claims, 4 Drawing Sheets

VIDEOCONFERENCING SYSTEMS WITH RECOGNITION ABILITY

RELATED APPLICATIONS

This application is a continuation of U.S. application Ser. No. 10/064,158 filed Jun. 14, 2002.

BACKGROUND

Videoconferencing systems allow users to communicate interactively, while seeing one another, even though they are not physically in the same place.

SUMMARY

The present application teaches advancements for videoconferencing systems. One aspect of this system recognizes voices and converts the voice as recognized to another form. Another aspect considers compensation for time delays which may occur in the system.

BRIEF DESCRIPTION OF THE DRAWINGS

These and other aspects will now be described in detail with reference to the accompanying drawings, wherein.

DETAILED DESCRIPTION

Figure 1:
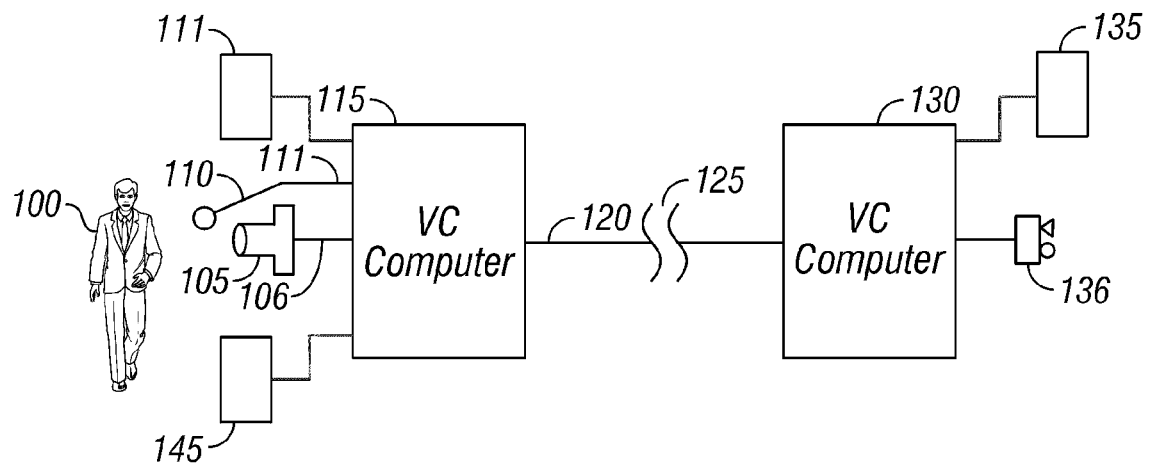
FIG. 1 shows a basic embodiment of a videoconferencing system.

A block diagram of the videoconferencing system is shown in FIG. 1. A first user 100 is shown with a video camera 105 and an audio microphone 110. The video 106 and audio 111 are fed into respective inputs within the videoconferencing computer module 115, with the video camera being input into a video input, and the microphone being input into an audio input. The module 115 prepares the information for sending over the channel. A transmission device, e.g. a coding module, may carry out the transmission over the channel. The videoconferencing module 115 also receives communication information from the channel, from other comparable modules on the channel.

In order to conserve bandwidth, the videoconferencing computer may digitize and compress the video 106 and audio 111. The output signal is often a digital form signal 120. The digital output 120 is sent over the channel, here a network 125, to a corresponding videoconferencing computer 130 at a distant end. The videoconferencing computer 130 includes a display element 135 that displays the video and audio that have been sent over the network.

In the configuration shown in FIG. 1, the videoconferencing computer 115 may be thought of as the master, since it is sending the information to the videoconferencing computer 130. The videoconferencing computer 130 may be thought of as the slave, receiving the information from computer 115. Of course, in a usual system, the videoconferencing computer 130 will also include camera and microphone 136 to enable two-way communication. Correspondingly, the videoconferencing computer 115 will include a display 111. That means that sometimes the videoconferencing computer 115 is acting as the master with the videoconferencing computer 130 acting as the slave. At other times, the functions are reversed.

FIG. 1 also shows some additional controls 145. These controls include the exclusive access request, in which a master requests exclusive access for a time, and the "raise hand" request, in which one of the computers, when communicating as a slave, signals its desire to become the master.

Figure 2:
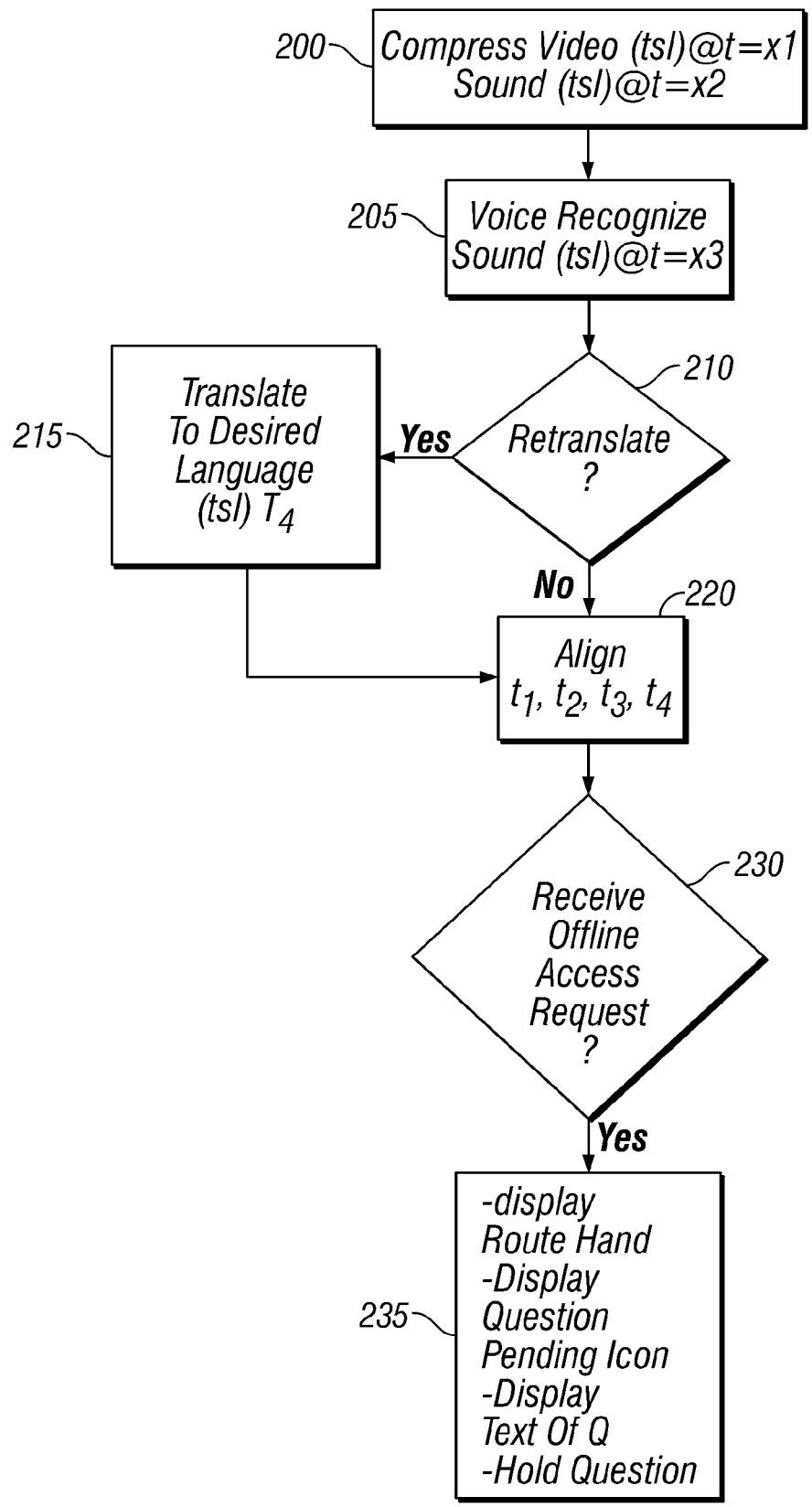
FIG. 2 shows a flowchart of operations including retranslation of language and time alignment.

According to an embodiment, the master operates according to the flowchart of FIG. 2. All of these operations may be carried out by a processor within the computer 154 and/or may be carried out for more dedicated hardware within the computer. It should also be understood that some operations specified by this flowchart may be carried out without carrying out the remaining operations.

It is conventional to compress the information being transmitted over videoconference, in order to make maximum use of the bandwidth available. At 200, both the video and sound are compressed. However, there is often more information in the video, and hence it may take longer computational wise to compress and transmit the video than the sound. In the embodiment, both the video and sound are compressed along with a timestamp indicative of their time of creation. Here, the video and sound are stored along with the timestamp TS1, indicating the time when that batch was produced. The timestamps may be produced at any desired time interval, for example every one-third second, or at the beginning of any spoken phrase.

The sound is also recognized at 205. For example, this may use a conventional speech to voice, speaker independent, voice recognition system. This produces text indicative of the spoken word. Again, this text is stored along with a timestamp indicative of the time of creation, again here TS1. The voice recognition may take even longer than the compression.

200, 205 show the timestamps (TS1) indicating the time when the video/sound/recognition was carried out. The actual time when the information is compressed is also shown, that is the video is compressed at time x1; the sound at time x2 and the voice recognition at time x3. At 210 an optional step of retranslation may be carried out. For example, a language conversion program may be used on the voice-recognized text in order to retranslate that text into a desired language at 215. This is also stored along with timestamp TS1 and is carried out at x4. At 220, all of the information, including the compressed video and sound, voice-recognized sound (which may be, for example, textual information), and translated information corresponding to the voice recognized sound, is aligned in time, so that it may be sent aligned in time. As an alternative, the information is sent as available, along with the timestamp information. The information is then time aligned at the remote end. Whether aligned at the transmitting end, or at the remote end, the time stamp information may be used to align the different parts of the message in time.

At 225, this information may be sent to the slave.

230 represents receiving an off-line access request from the slave. This is done, for example, during the time when the master has requested "exclusive access". During the exclusive access, all the slaves are sent a message that instructs the slaves that another unit has exclusive access. The slaves, therefore, are prohibited from sending a message during this time. This prevents two different users from talking at the same time, and allows one speaker to "have the floor". However, during the time that the one "master" has exclusive access, any of the "slaves" can send an off-line access request at 230. The off-line access request allows any of the slaves to signal a desire to speak. This may cause a "raise hand" icon to be sent to the master, so that the user at the master recognizes that someone else wants to speak.

Figure 3:
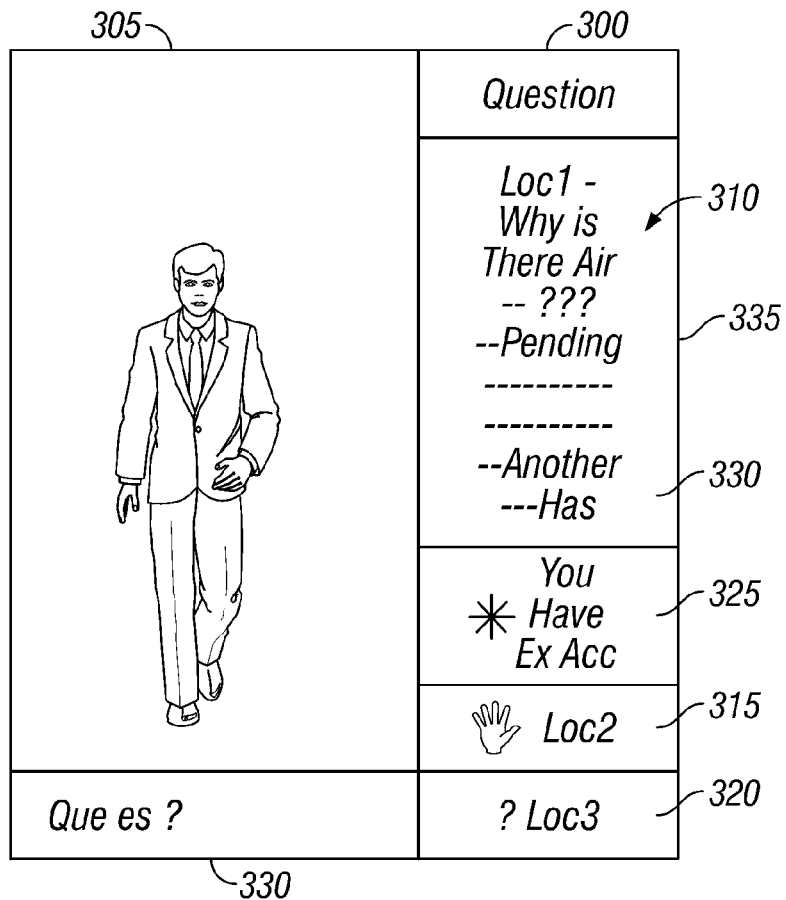
FIG. 3 shows an exemplary screen on a videoconferencing system.

In one embodiment, questions may be recorded and sent from slave to master. For example, packets representing the audio, video, text, and other, may be sent, representing a question. At that time, a "question pending" icon may be received and displayed, so that the master recognizes that a question is waiting. If the packet includes text indicative of the question, the text may be displayed while the master is still maintaining exclusive access. An exemplary display is shown in FIG. 3. This figure shows how a panel 300 of the display is displayed side-by-side with the actual display itself 305. This panel may include the text comments 310 that are sent and displayed at 235. The panel may also include a raise hand icon 315, a question pending icon 320, and an icon 325 indicating that the current system has exclusive access. An inactive icon shown as 330 indicates that another has exclusive access, and during this time, only certain kinds of communications can be made. In addition, any recognized or translated information can be displayed as close captioning, for example, shown as 330. This information may be transmitted as part of the transmitted video information, or can be transmitted using conventional closed captioning techniques.

Figure 4:
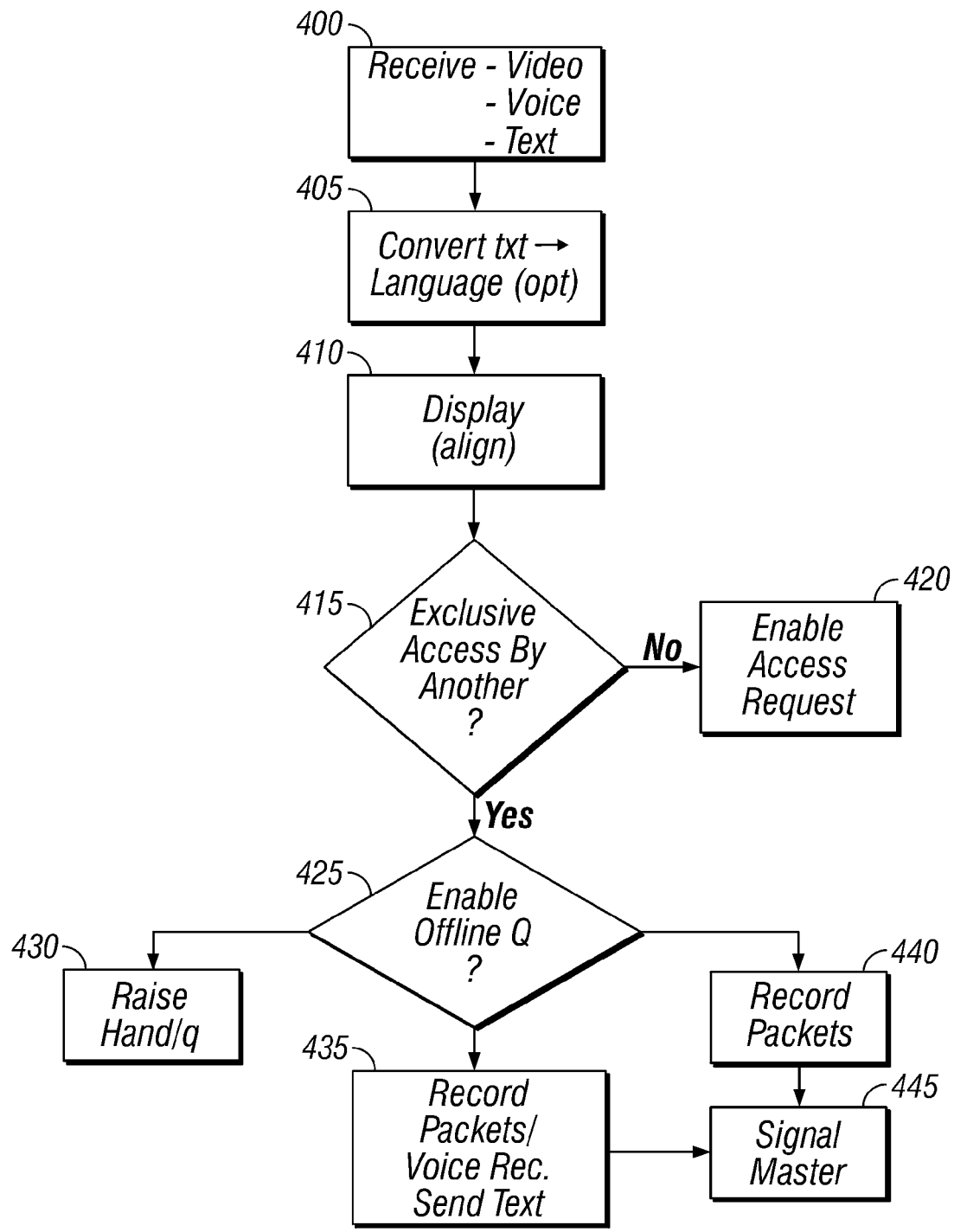
FIG. 4 shows a flowchart of operation of the exclusive access embodiment.

FIG. 4 represents the routine which is being carried out in the "slave". At 400, the slave receives the transmission which may include video, voice and text. The text may be both same language text or translated text, and may be as part of the digital information, or in closed captioning parts of the signal. An optional operation at 405 may convert the same language text into another language. For example, any of a number of clients may convert the information to their own desired language.

At 410, the received information is displayed. The time alignment markers may be used to maintain alignment, and/or the alignment can be taken from the way in which the information is transmitted. For example, since alignment is carried out at 220, time-aligned signals can be received and immediately displayed.

At 415, the system detects whether another unit has exclusive access. If not, the exclusive access request is enabled at 420. However, if another unit has exclusive access, then at 425, online communication is disabled, but off-line communication is enabled. The off-line communications that are enabled at 425 include the raise hand and question icons, which enable that sending/displaying the icon for either raising a hand or asking a question to the current "master". Another operation at 435, records packets of information (video and sound or just sound). The voice is voice recognized at 435, and text only is sent. The text is displayed in FIG. 3 at 310. In this way, the exclusive-access user can see the text simultaneously with other operations. 440 shows the different action in which packets are recorded. These packets can be sent later, that is when the exclusive access ends. In both cases, the master unit is signaled that communication is pending. FIG. 3 shows the icon 335 which signals that an incoming communication is still pending.

When the master has exclusive access, it prevents two people talking at once. However, multi-unit conversation is still possible, since other units can send questions which can be displayed to the master, and can send requests as icons which can also be displayed.

Figure 5:
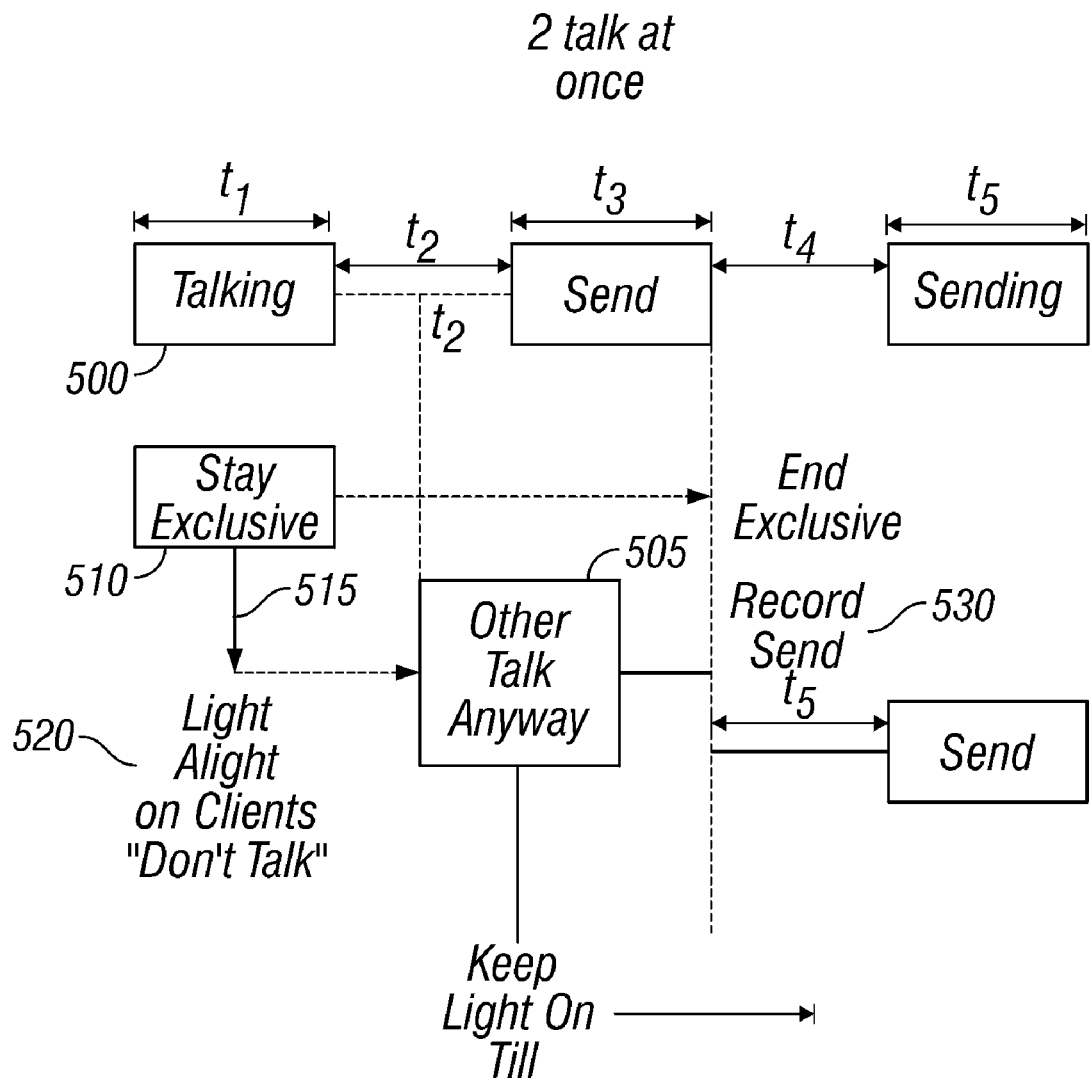
FIG. 5 shows a timing chart of the exclusive access system.

However, during times of nonexclusive access, it is also possible for two people to talk at once. This is because there is often a delay between the time when one person is talking, and the time when the other unit receives that talking. For example, FIG. 5 shows how this can happen. The unit 1 is talking during the time T-1. During the time T-2, operations are carried out including alignment operations and compression operations as well as latency in the system. The information is sent during T3, and presumably received at T-4. However, during the times prior to T-1, another unit might not realize that the first unit is talking. Unit 505 is shown beginning to talk at the time T-2, which is between the end of the first unit talking and the reception. More generally, this may be happening any time between T-1 and T-4.

In this embodiment, when the user begins talking at T-1, an exclusive flag is raised shown as 510. This exclusive flag is sent to the slave at 515, and lights a light on the slave indicating that the slave should not talk. Effectively, this indicates that a communication from another unit is pending. At 505, the other unit become begins talking anyway. However, the communication sent to the unit prevents the other talking from being transmitted. At 530, the information is recorded. 525 represents the end of the sending period, that is when all the information recorded during T-1 is finished sending. At T-5, this information, recorded during the time T-2, is sent. In this way, the users are prevented from talking at the same time. Collisions are avoided, and every user gets to hear what the other user says.

Although only a few embodiments have been disclosed in detail above, other modifications are possible. For example, the text, and language converted text, can be played by a text to voice synthesizer, instead of being displayed as text. All such modifications are intended to be encompassed within the following claims.

The invention claimed is:

1. A method, comprising:
   sending video and audio signals over a channel from a first user to both second and third users and providing output of said video and audio signals for said second and third users;
   detecting a detection from said second user requesting to send information to said first user;
   displaying a first visual indication to said first user that said second user is requesting to send information;
   detecting a detection from said third user requesting to send information to said first user;
   displaying a visual indication to said first user that said third user is requesting to send information; and
   detecting a detection from another user terminal requesting to send a question to said first user and displaying a second visual indication, different than said first visual indication, where said second visual indication indicates that said second user is requesting to send a question to said first user, and where said second visual indication is different in look than said first visual indication.

2. A method as in claim 1, further comprising blocking said second and third users from sending transmissions when displaying said visual indication.

3. A method as in claim 1, further comprising creating text messages displaying said text messages as part of said output on a same display that displays said video and audio signals, wherein said providing output comprises providing a display that is based on both said video and audio signals on a videoconferencing terminal, and also displaying said text messages at said videoconferencing terminal on the same display that displays said video and audio signals, and where said text messages represent different information than either of said audio or video signals.

4. A method as in claim 3, further comprising time aligning a time of displaying said text messages with a time of displaying at least one of said video and audio signals.

5. A method as in claim 3, further comprising compressing said video and audio signals, which takes different amounts of time for said compressing, and further comprising time aligning a time of displaying said text messages with a time of displaying at least one of said video and audio signals.

6. An apparatus, comprising:
- a first user terminal, obtaining and sending video and audio signals over a channel, detecting a detection from a second user terminal requesting to send information to said first user and displaying a visual indication to said first user that said second user is requesting to send information to said first user terminal; and detecting a detection from a second user terminal requesting to send a question to said first user and displaying a second visual indication, different than said first visual indication, where said second visual indication indicates that said second user is requesting to send a question to said first user terminal.

7. An apparatus as in claim 6, wherein said first user terminal receives text messages over said channel and displays said text messages as part of said output for on a same display screen that displays said video and audio signals, and where said text messages represent different information than either of said audio or video signals.

8. A method as in claim 7, further comprising time aligning a time of displaying said text messages with a time of displaying at least one of said video and audio signals.

9. A method, comprising:
- sending video and audio signals over a channel from a first user to both second and third users and providing output of said video and audio signals for said second and third users;
- detecting a detection from said second user requesting to send a question to said first user;
- displaying a first visual indication to said first user that said second user is requesting to send a question;
- detecting a detection from said third user requesting to send another kind of information other than a question to said first user;
- displaying a second visual indication to said first user that said third user is requesting to send said another kind of information, and where said second visual indication is different in look than said first visual indication.

10. A method as in claim 9, further comprising sending text messages and displaying said text messages as part of said output for another user on a same screen that displays said video and audio signals, and where said text messages represent different information than either of said audio or video signals,
wherein said providing output comprises providing a display that is based on both said video and audio signals on a videoconferencing terminal, and also displaying said text messages at said videoconferencing terminal on the same screen that displays said video and audio signals.

11. A method as in claim 10, further comprising time aligning a time of displaying said text messages with a time of displaying at least one of said video and audio signals.

12. A method as in claim 11, further comprising compressing said video and audio signals, which takes different amounts of time for said compressing, and further comprising time aligning a time of displaying said text messages with a time of displaying at least one of said video and audio signals.

* * * * *

UNITED STATES PATENT AND TRADEMARK OFFICE
CERTIFICATE OF CORRECTION

| | | |
|---|---|---|
| PATENT NO. | : 7,990,411 B2 | Page 1 of 1 |
| APPLICATION NO. | : 12/190304 | |
| DATED | : August 2, 2011 | |
| INVENTOR(S) | : Harris | |

It is certified that error appears in the above-identified patent and that said Letters Patent is hereby corrected as shown below:

Column 5, line 24, in Claim 8, delete "A method as in claim 7," and insert -- An apparatus as in claim 7, --.

Signed and Sealed this
Twenty-seventh Day of March, 2012

David J. Kappos
*Director of the United States Patent and Trademark Office*